Oct. 3, 1961  G. F. QUAYLE  3,002,498
SELECTOR VALVE

Filed Feb. 4, 1960  3 Sheets-Sheet 1

INVENTOR.
GEORGE F. QUAYLE
BY A. H. Golden
ATTORNEY

Oct. 3, 1961   G. F. QUAYLE   3,002,498
SELECTOR VALVE
Filed Feb. 4, 1960   3 Sheets-Sheet 2
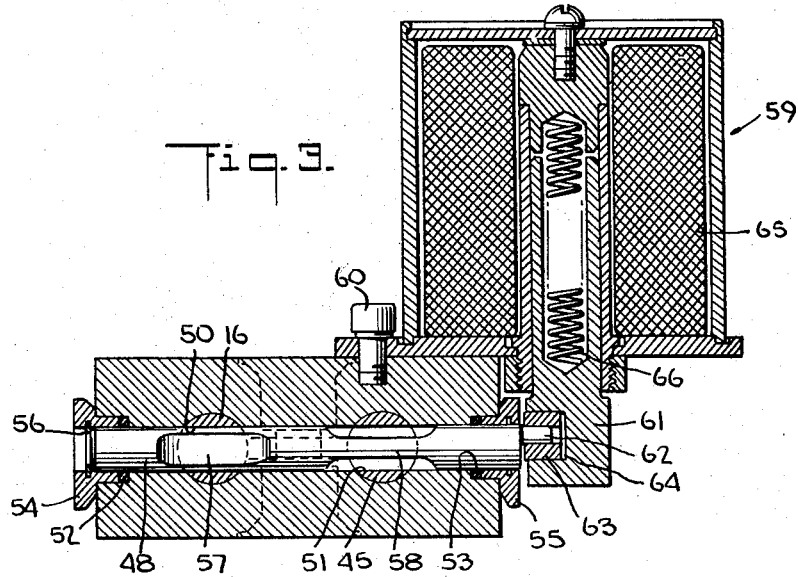
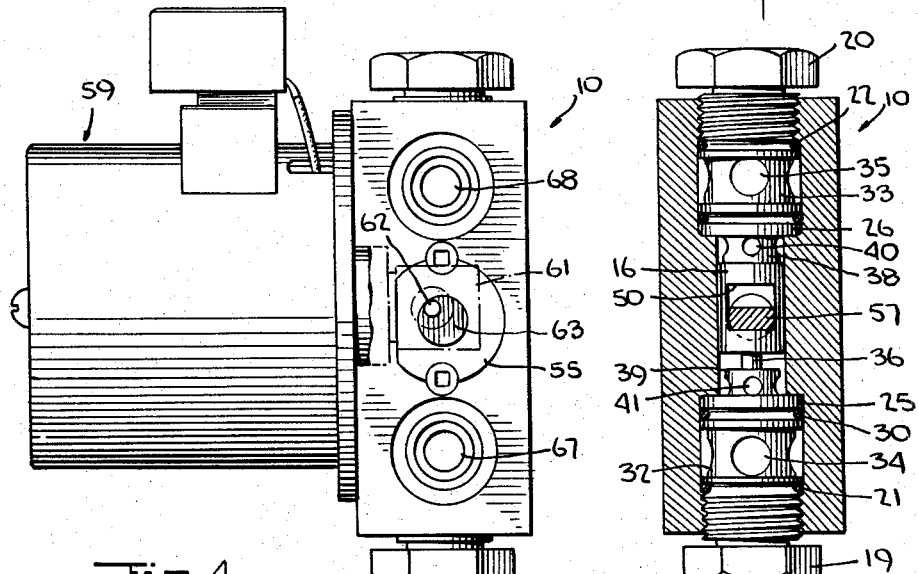
INVENTOR.
GEORGE F. QUAYLE
BY
*H. H. Golden*
ATTORNEY Oct. 3, 1961 G. F. QUAYLE 3,002,498
SELECTOR VALVE
Filed Feb. 4, 1960 3 Sheets-Sheet 3
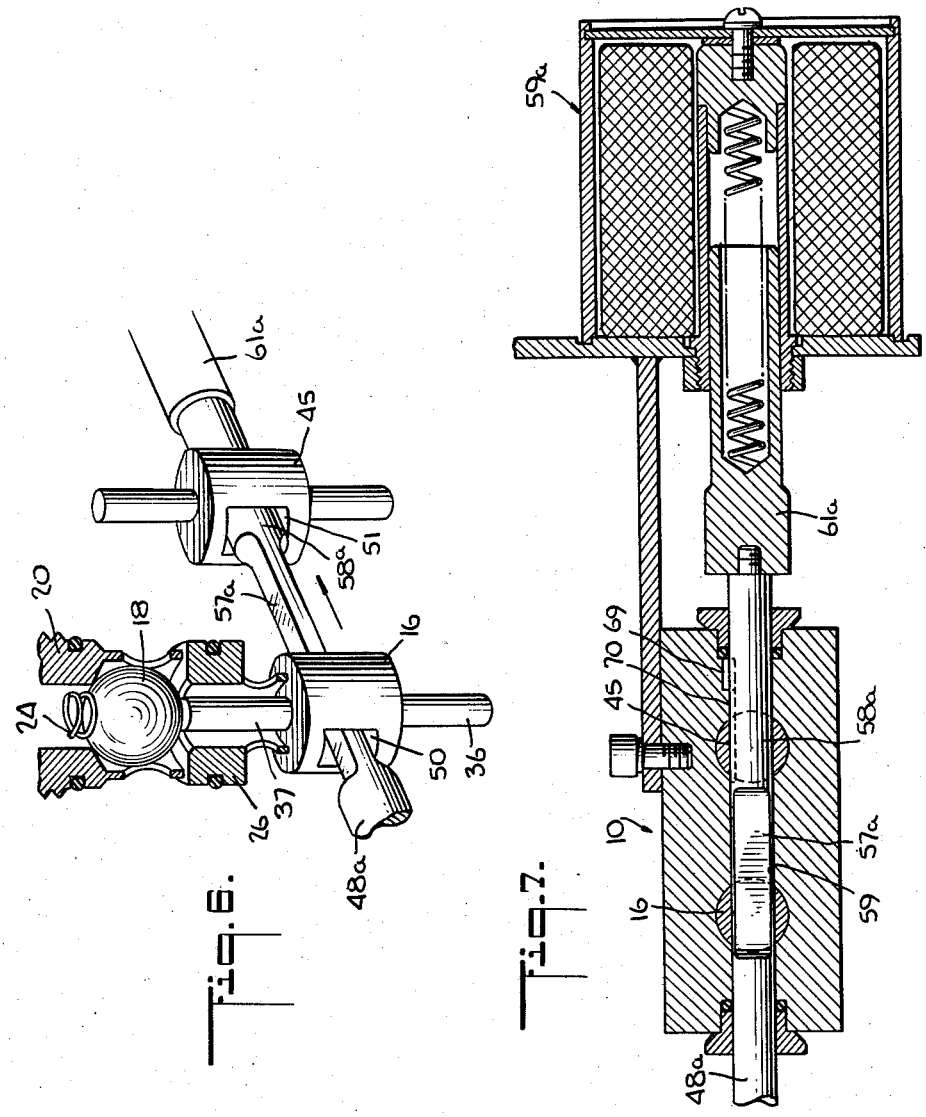
INVENTOR.
GEORGE F. QUAYLE
BY
*A. H. Golden*
ATTORNEY United States Patent Office 3,002,498
Patented Oct. 3, 1961

3,002,498
SELECTOR VALVE
George F. Quayle, Philadelphia, Pa., assignor to The Yale and Towne Manufacturing Company, Stamford, Conn., a corporation of Connecticut
Filed Feb. 4, 1960, Ser. No. 6,739
9 Claims. (Cl. 121—40)

This invention relates to a valve for controlling fluid circuits.

In many instances it is found necessary to locate two or more fluid actuated rams, or other fluid actuated mechanisms, a considerable distance from the operator. This is particularly true in materials handling equipment such as lift trucks and the like in which fluid actuated rams are commonly provided on the load lifting carriages remote from the operator's seat.

Under these circumstances it is necessary to either position the fluid control valve for the rams adjacent the operator's seat and provide separate flexible hoses leading from this valve to each ram, or to position the fluid control valve adjacent the rams and control the valve electrically through an electric cable leading from the valve to an electric switch adjacent the operator's seat. This latter arrangement and the advantages thereof are generally described in U.S. Patent No. 2,754,018 to C. S. Schroeder, dated July 10, 1956, and assigned to the same assignee as the instant application. As pointed out in Patent No. 2,754,018, the former arrangement requires a complex array of flexible hose. The latter arrangement, on the other hand, requires a single set of hose and a relatively small multiple conductor electric cable. The latter arrangement is, therefore, considered the preferred arrangement.

In utilizing this preferred arrangement it has heretofore been the practice to use a solenoid actuated spool valve of the type generally shown in U.S. Patent No. 2,754,018. The spool of such a valve retains the fluid, and the spool therefore must necessarily have very small clearance with the bore of the valve to prevent leakage of the fluid. Because of this small clearance and because the fluid on continued use often becomes gummy, the spool of such a valve is subject to sticking. This sticking is often so severe that the relatively weak solenoid is unable to shift the spool to control the fluid circuit. Accordingly, such valves are not reliable.

The valve of the present invention obviates the problem encountered with solenoid operated spool valves as heretofore used by providing means actuated by the fluid pressure itself, rather than a relatively weak solenoid, to open the circuit, and by providing a control member movable to block the fluid actuated means to prevent the opening of the circuit thereby when such is desired.

As the control member does not in itself retain the fluid, as is the case of the spool in a spool valve, the control member may have relatively large clearance with its guiding structure. Accordingly, the control member is not subject to sticking and may be operated by a relatively weak power source, such as a solenoid. Thus, the valve of the invention permits a relatively large force created by the fluid pressure to be used to quickly and reliably open the circuit, and permits the application of this large force to be controlled by a relatively weak power source, such as a solenoid.

Other advantages of the valve of the invention will become apparent from the following description when read in conjunction with the accompanying drawings, wherein:

FIG. 1 includes a sectional view of a valve constructed in accordance with the present invention and a diagrammatic showing of typical fluid circuits which may be controlled by the valve;

FIG. 3 is a sectional view taken on the line 3—3 of FIG. 1;

FIG. 4 is a right side view of the valve as shown in FIG. 1;

FIG. 5 is a sectional view taken on the line 5—5 of FIG. 1;

FIG. 6 is a perspective view similar to that of FIG. 2, but showing a modified control member, and FIG. 7 is a sectional view similar to that shown in FIG. 3, but incorporating the modified control member of FIG. 6, and a different orientation of the operating solenoid.

Figure 1:
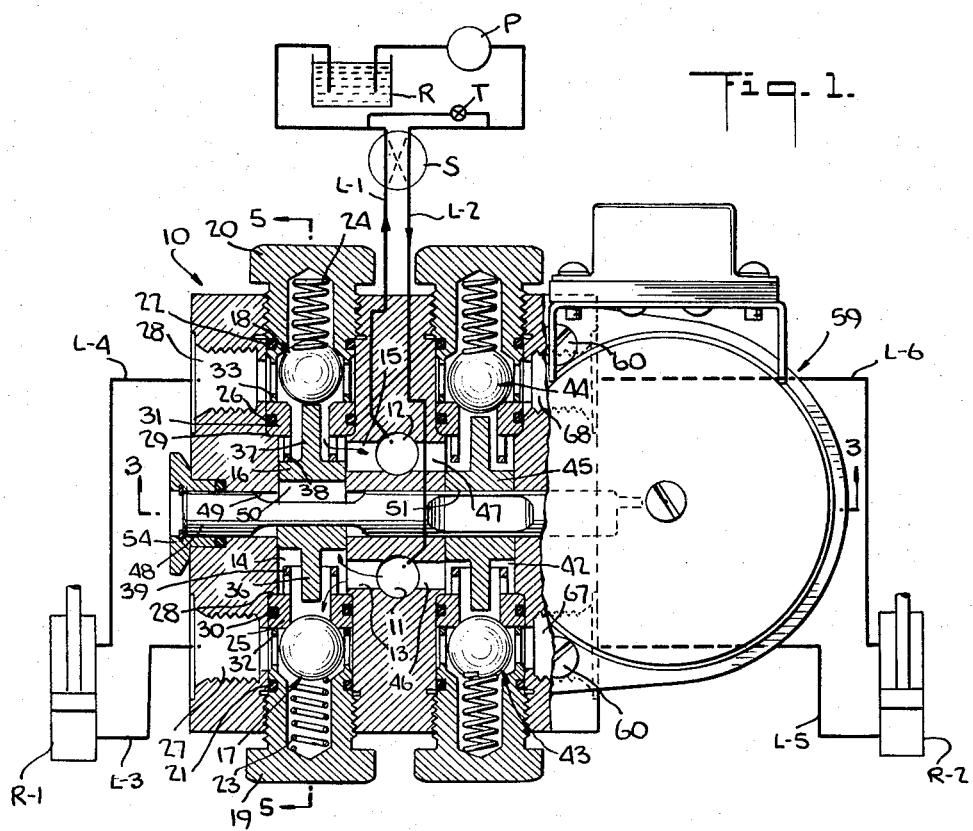

Referring to the drawings and in particular to FIG. 1, a valve 10, constructed in accordance with the present invention, is shown connected diagrammatically in a fluid system for controlling the flow of fluid between a source of fluid under pressure, such as indicated by a reservoir R and pump P, and a pair of rams R–1 and R–2.

As shown in FIG. 1, the valve 10 includes separate inlet and outlet ports 11 and 12 which extend inwardly from the outer surface of the valve. The ports 11 and 12 are adapted to be connected to lines L–1 and L–2 from the source of fluid pressure and the direction of the fluid pressure in the lines L–1 and L–2 may be reversed by a suitable reversing valve, as diagrammatically indicated at S in FIG. 1.

The circuit of the valve 10 which controls ram R–1 is shown on the left hand side of the valve as viewed in FIG. 1, while the circuit of the valve 10 which controls ram R–2 is shown on the right hand side of the valve as viewed in FIG. 1. The two circuits are identical and, therefore, only the circuit on the left hand side of the valve will be described in detail, it being understood that like elements in the circuit on the right hand side valve are of the same construction and function in the same manner.

Referring to the left hand side of the valve as shown in FIG. 1, an internal passageway 13 connects port 11 with a lower portion of a bore 14, and a passageway 15 connects port 12 with an upper portion of the bore 14, above a piston 16 which is slidably received in the bore 14. As will be described in detail hereafter, the piston 16 serves to unseat either a ball check valve 17 or a ball check 18 when moved by fluid pressure in the bore 14 in one direction or the other to open a return circuit from the ram R–1.

The bore 14 extends completely through the valve body and the ends of the bore are closed by threaded plugs 19 and 20. Plugs 19 and 20 are provided with suitable gaskets 21 and 22, respectively, to prevent leakage of fluid past the plugs.

The plugs 19 and 20 are hollow and in addition to closing the ends of the bore 14 also serve as guides for springs 23 and 24 which press opposed ball check valves 17 and 18 against their respective valve seats 25 and 26. The ball check valves 17 and 18 prevent return flow of fluid from the ram R–1 through lines L–3 and L–4 and ports 27 and 28 unless either ball check valve 17 or 18 is lifted from its seat by the piston 16. Valve seats 25 and 26 are carried on shoulders 28 and 29 formed in the bore 14, and are provided with suitable gaskets 30 and 31 to prevent leakage of fluid past the seat. The seats 25 and 26 are pressed against the shoulders 28 and 29 by annular extensions 32 and 33 provided respectively on the inner ends of the plugs 19 and 20. As can be best seen in FIG. 5, the annular extensions 32 and 33 are provided with apertures 34 and 35 to permit the passage of fluid.

Figure 2:
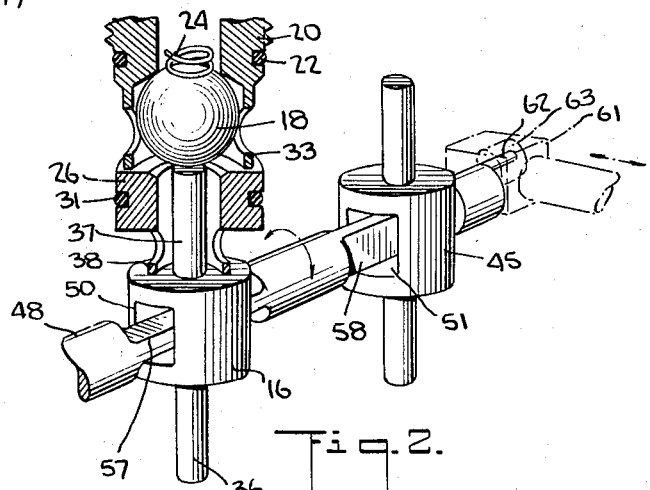
FIG. 2 is a perspective view of a portion of the valve structure removed from the remainder of the valve to show details and operation thereof.

Referring to FIGS. 1 and 2, the piston 16 has elongated end portions 36 and 37. The piston 16 is adapted to be moved by fluid pressure acting on one side or the other thereof from a position against an annular stop 38, as shown in FIGS. 1 and 2, to a position against an annular stop 39. Annular stop 38 is formed on the inner face of valve seat 26 and annular stop 39 is formed on the inner face of valve seat 25. As best shown in FIG. 5, the stop 38 is provided with apertures 40 and the stop 39 is provided with apertures 41 to permit the passage of fluid.

When the piston 16 is in the extreme upper position, as shown in FIGS. 1 and 2, the end 37 of the piston engages and lifts ball check valve 18 from the seat 26 to permit return flow of fluid from the upper side of the piston of the ram R–1. In the extreme downward position of the piston 16, the end 36 thereof engages and moves ball check valve 17 from the seat 25 to permit return flow of fluid from the lower side of the piston of the ram R–1. In this manner the pressure of the fluid acting on the piston 16 serves to open a return circuit from the ram R–1 by unseating either ball check valve 17 or ball check valve 18, depending on the direction of the fluid pressure.

As previously stated, the circuit of the valve 10 for the ram R–2 is identical to that for the ram R–1 and briefly includes, as shown on the right hand side of the valve as viewed in FIG. 1, a bore 42 having opposed ball check valves 43 and 44 at opposite ends thereof, and a piston 45 slidably received in the bore 42. A passageway 46 connects port 11 with the bore 42 on the lower side of the piston 45 and a passageway 47 connects the bore 42 on the upper side of the piston 42 with the port 12. Piston 45 is adapted to open either ball check valve 43 or 44 in the same manner that piston 16 opens the ball check valve 17 or 18.

In accordance with the invention, pistons 16 and 45 are adapted to be selectively locked in an intermediate position to prevent their opening the check valves 17 and 18 or 43 and 44 associated therewith. As best shown in FIGS. 1, 2, 3 and 5, the pistons 16 and 45 are selectively locked in this intermediate position by a rotatable control rod 48. Control rod 48 is rotatably supported in a bore 49, and extends through square openings 50 and 51 in piston 16 and piston 45, respectively. As best shown in FIG. 3, the ends of the control rod 48 are provided with suitable packings 52 and 53 which are retained by bushings 54 and 55 which are forced into enlarged ends of the bore 49. A split ring 56 fits into a groove in the bushing 54 and prevents outward axial movement of the control rod 48.

As best shown in FIGS. 1, 2 and 5, the control rod 48 is provided with a first flat portion 57 where the rod extends through opening 50 of the piston 16 and a second flat portion 58 where the rod extends through open 51 of the piston 45. The two flat portions 57 and 58 are at right angles to one another and the diameter of the rod at these portions is approximately equal to the width of the openings 50 and 51 through the pistons 16 and 45. It is apparent, therefore, that when the flat portion 57 is turned to a position at right angles to the direction of movement of piston 16, as best shown in FIGS. 1 and 2, the piston 16 may move to unseat either the ball check valve 17 or the ball check valve 18, depending on the direction of the fluid pressure acting on the piston 16. At the same time, the flat portion 58 will be in a position that it locks the piston 45 in an intermediate position as shown in FIG. 1, so that the piston 45 cannot open either check valve 43 or 44. If, however, the control rod 48 is rotated 90°, the piston 45 will be released, so that it can open either check valve 43 or 44. At the same time the piston 16 will be locked in an intermediate position so that it cannot open either ball check valves 17 or 18.

As the control rod 48 does not itself retain the fluid it may have relatively large clearance with the bore 49 so that it is not subject to sticking. The control rod 48 can, therefore, be rotated by a relatively weak power source, such as the solenoid 59 shown in the drawings. As best shown in FIGS. 1 and 3, solenoid 59 is secured to the valve 10 by bolts 60. The plunger 61 of the solenoid 59 extends toward the end of the control rod 48, and the end of the control rod 48 has an eccentric projection 62 which extends into a roller 63 adapted to roll in a slot 64 formed in the end of the plunger 61. When the coil 65 of the solenoid 59 is energized from a suitable source of electrical energy (not shown) the plunger 61 is drawn in, as shown in FIG. 3, compressing a spring 66. When the coil 65 is de-energized, the spring 66 extends the plunger 61 to thereby rotate the control rod 48 through 90° to thereby lock piston 16 in an intermediate position and release piston 45.

Operation

Assuming that the control rod 48 is in the position shown in FIG. 1, that all the ball check valves 17, 18, 43 and 44 are closed against their respective seats, and that the reversing valve S is turned to admit fluid from the source of fluid pressure to port 11, the fluid flows through passageway 13 into the bore 14 and forces ball check valve 17 away from its seat 25. The fluid then passes out of port 27 and through line L–3 to the lower side of the piston of ram R–1. Flow of fluid from the upper side of the piston of ram R–1 is, however, blocked by ball check valve 18 with the result that the pressure of the fluid below the piston of the ram R–1 builds up and acts against the lower surface of piston 16. As the area of the piston 16 on which the pressure acts is greater than the projected area of the ball check valve 18, the piston 16 moves upwardly and the end 37 of the piston engages and lifts the ball check valve 18 from its seat 26 to complete the circuit to the ram R–1 and allow the fluid from the upper side of the piston of the ram R–1 to return through line L–4, port 28, the uper portion of bore 14, passageway 15, the port 12, and line L–2 back to the reservoir R.

During this time, the piston 45 on the right hand side of the valve 10 is locked against movement by the portion 58 of the control rod 48 so that check valves 29 and 30 cannot be opened by the piston 45. If, however, the solenoid 59 is de-energized so that the control rod 48 is rotated 90°, the piston 16 is then locked in an intermediate position so that it cannot open check valves 17 and 18 and the circuit to ram R–1 remains closed. The piston 45, however, is released so that the piston 45 can be moved by the fluid pressure to lift check valve 44 to open the circuit through ports 67, 68, and lines L–5, L–6 to ram R–2. Substantially simultaneously with the operation of the solenoid 59, the fluid pressure on the ports 11 and 12 is released by operation of a suitable valve, such as indicated at T, to bypass fluid from pump P to reservoir R so that there is no pressure on the pistons 16 and 45 during the releasing of one piston and the locking of the other piston by rotation of the control rod 48.

If the reversing valve S is turned to admit fluid under pressure to port 12 rather than to port 11, it will be apparent that either piston 16 or piston 45 will be moved downwardly to open either ball check valves 17 or 43, depending on the position of the control rod 48, to complete a circuit to retract either ram R–1 or R–2.

Modification

In FIGS. 6 and 7 there is shown a slightly modified form of the invention which functions in the same manner as the valve illustrated in FIGS. 1 to 5, except that the control rod is adapted to be moved axially rather than to be rotated to release one of the pistons 16 or 45 and to lock the other piston. To this end, the control rod 48, illustrated in FIGS. 1, 2, 3, and 5, is replaced by a control rod 48a of slightly different form. The control rod 48a is provided with a flattened portion 57a of substantial length, and when the control rod 48a is in the position as shown in FIGS. 6 and 7, the flattened portion 57a extends through the opening 50 of the piston 16 so that the piston 16 is free to be moved by fluid pressure to unseat either check valve 17 or 18. The piston 45, however, is locked against movement because the portion 58a of the control rod 48a which extends through the opening 51 of piston 45 is of full section having a diameter substantially equal to the heighth of the opening 51. If the control rod 48a is shifted in the direction of the arrow in FIG. 6 so that the flattened portion 57a extends through the opening 51 of piston 45 and a portion of the control rod 48a of full section extends through the opening 50 of piston 16, then piston 45 is free to move to unseat either check valve 43 or 44, and piston 6 is locked against movement.

The control rod 48a, like the control rod 48, may have relatively large clearance with the bore 49 so that it is not subject to sticking and may be shifted axially by means of a solenoid 59a which is secured to the valve 10 and has its core 61a aligned with and secured to the end of the control rod 48a, as shown in FIG. 7. The solenoid 59a is shown in de-energized condition in FIG. 7. In order to prevent rotation of the control rod 48a, while permitting axial movement thereof, the control rod 48a is keyed to the valve 10 by means of a key 69 which extends into a key slot 76 formed in the control rod 48a.

From the preceding description it can be seen that there is provided a novel valve in which a control member controls the opening of a fluid circuit by means actuated by the relatively large force created by the fluid pressure of the fluid being controlled. As the control member itself does not open the circuit and does not retain the fluid, it may have relatively large clearance with the valve body. Accordingly, it is not subject to sticking and may be actuated by a relatively weak power source. Thus, the valve of the invention permits a relatively large force created by the fluid pressure to be used to open the fluid circuit and permits the application of the large force to be controlled by a relatively weak power source, such as a solenoid.

While specific forms of the invention have been shown and described, it will be appreciated that this is for the purpose of illustration and that changes and modifications may be made therein without departing from the spirit and scope of the invention.

I now claim:

1. A valve comprising, a valve body, two pairs of passageways in said body, each pair of passageways providing a supply passageway and a return passageway, means in each of said return passageways for preventing return of fluid through said return passageways, actuating means for each pair of passageways operable by fluid pressure applied to said supply passageways to open said first named means to permit the return of fluid through said return passageways, and means selectively operative to prevent the actuating means of one or the other of said pairs of passageways from opening said first named means of one of said pairs of passageways whereby flow of fluid is restricted to the other of said pairs of passageways.

2. A valve comprising, a valve body, two pairs of passageways, means in each passageway of each pair of passageways for preventing return of fluid through each of said passageways, actuating means for each pair of passageways operative by the application of fluid pressure to one passageway of each pair of passageways to open said means in other passageway of each pair of passageways to permit the return of fluid through said other passageway, and means selective operative to prevent the actuating means of one or the other of said pairs of passageways from opening said first named means of one of said pairs of passageways whereby flow of fluid is restricted to the other of said pairs of passageways.

3. A valve comprising, a valve body, a pair of passageways in said body providing a supply passageway and a return passageway, a check valve in said return passageway preventing return flow of fluid through said return passageway, a bore interconnecting said passageway, a piston slidable in said bore and movable by fluid under pressure applied to said supply passageway to open said check valve in said return passageway to permit the return of fluid through said return passageway, said piston having an opening extending transversely therethrough, a movable control rod extending through said opening and means on said control rod for blocking movement of said piston in one position of said control rod whereby to prevent said piston from opening said check valve.

4. A valve comprising, a valve body, two pairs of passageways in said body, a check valve in each passageway of each pair of passageways for preventing return flow of fluid through each passageway, a bore interconnecting the passageways of each pair of passageways, a piston slidable in each bore and movable by fluid under pressure applied to one passageway of each pair of passageways to open the check valve in the other passageway of each pair of passageways to permit return flow of fluid through the other passageway, and means for selectively blocking movement of the piston in one bore or the other bore to prevent said piston from opening a check valve in one of said pairs of passageways whereby flow of fluid is restricted to the other of said passageways.

5. A valve comprising, a valve body, two pairs of passageways in said body, a check valve in each passageway of each pair of passageways for preventing return flow of fluid through each passageway, a bore interconnecting the passageways of each pair of passageways, a piston slidable in each bore and movable by fluid under pressure to one passageway of each pair of passageways to open the check valve in the other passageway of each pair of passageways to permit return flow of fluid through the other passageway, and a control member movable between a position blocking movement of the piston in one bore and a position blocking movement of the piston in the other bore whereby movement of one or the other of said pistons may be blocked to restrict flow to one of said pairs of passageways.

6. A valve comprising, a valve body, two pairs of passageways in said body, a check valve in each passageway of each pair of passageways for preventing return flow of fluid through each passageway, a bore interconnecting the passageways of each pair of passageways, a piston slidable in each bore and movable by fluid under pressure applied to one passageway of each pair of passageways to open the check valve in the other passageway of each pair of passageways to permit return flow of fluid through the other passageway, the piston in each bore having an opening extending transversely therethrough, a movable control rod extending through the opening of each piston, means on said control rod for blocking movement of one piston in one position of said control rod, means on said control rod for blocking movement of the other piston in another position of said control rod, and means for moving said control rod between said positions whereby movement of one piston or the other may be selectively blocked to restrict flow to one of said pairs of passageways.

7. A valve comprising, means providing a pair of passageways, a check valve in each passageway preventing return flow of fluid through each passageway, fluid actuated means movable by the application of fluid pressure to one of said passageways to unseat the check valve in the other of said passageways to permit the return of fluid through said other passageway, and control means operative to prevent said fluid actuated means from unseating said check valves.

8. A fluid system comprising, a pair of rams, a source of fluid pressure, a passage from each end of each ram to said source of fluid pressure, a check valve for each passage, the application of fluid pressure to one passage to each ram unseating the check valve in said passage to allow fluid pressure to enter one side of the ram, a fluid actuated means for each ram moved by the fluid pressure applied to said one passage to unseat the check valve in the other passage to the other side of the same ram for the return of fluid from the ram whereby to allow operation of the ram, and a movable control member selectively moved to control movement of said fluid actuated means of said rams to prevent unseating of a check valve in a passage to one ram by one fluid actuated means while controlling the other fluid actuated means to allow unseating of a check valve in a passage to the other ram whereby to prevent operation of one ram and to allow operation of the other ram.

9. A fluid system comprising, a pair of rams, a source of fluid pressure, a passage from each end of each ram to said source of fluid pressure, a check valve for each passage, the application of fluid pressure to one passage to each ram unseating the check valve in said passage to allow fluid pressure to enter one side of the ram, a fluid actuated means for each ram moved by the fluid pressure applied to said one passage to unseat the check valve in the other passage to the other side of the same ram for the return of fluid from the ram whereby to allow operation of the ram, a movable control member selectively moved to control movement of said fluid actuated means of said rams to prevent unseating of a check valve in a passage to one ram by one fluid actuated means while controlling the other fluid actuated means to allow unseating of a check valve in a passage to the other ram whereby to prevent operation of one ram and to allow operation of the other ram, and valve means connected with said passageways operable to relieve fluid pressure on said fluid actuated means whereby said check valves close to prevent the flow of fluid under pressure from said rams to said fluid actuated means and said valve means prevent the application of fluid pressure from said source of fluid pressure to said fluid actuated means so that there is substantially no fluid pressure acting on said fluid actuated means resisting operation thereof by said control member.

References Cited in the file of this patent

UNITED STATES PATENTS

| | | |
|---|---|---|
| 2,401,258 | Livers | May 28, 1946 |
| 2,506,008 | Arps | May 2, 1950 |
| 2,575,507 | Acton | Nov. 20, 1951 |
| 2,720,755 | Gardiner | Oct. 18, 1955 |